United States Patent [19]
Compton et al.

[11] 3,874,238
[45] Apr. 1, 1975

[54] APPARATUS USING RADIOACTIVE PARTICLES FOR MEASURING GAS TEMPERATURES

[75] Inventors: William A. Compton; Thomas E. Duffy; Manfred I. Seegall, all of San Diego, Calif.

[73] Assignee: International Harvester Company, San Diego, Calif.

[22] Filed: Feb. 23, 1973

[21] Appl. No.: 335,147

Related U.S. Application Data
[63] Continuation-in-part of Ser. No. 293,347, Sept. 29, 1972, abandoned, which is a continuation of Ser. No. 88,670, Nov. 12, 1970, abandoned.

[52] U.S. Cl. ............. 73/339 R, 73/357, 235/151.3, 250/393
[51] Int. Cl. .... G01k 13/02, G01k 11/28, G01n 9/24
[58] Field of Search .......... 73/339 R, 344, 345, 349, 73/357; 235/151.3; 250/375, 393, 395

[56] References Cited
UNITED STATES PATENTS

| | | | |
|---|---|---|---|
| 2,534,352 | 12/1950 | Herzog | 250/375 |
| 2,908,819 | 10/1959 | Marx | 250/44 X |
| 3,095,740 | 7/1963 | Peacock | 73/116 UX |
| 3,100,395 | 8/1963 | Morley | 73/30 X |
| 3,162,043 | 12/1964 | Conow et al. | 235/151.3 X |
| 3,234,388 | 2/1966 | Shultz et al. | 250/393 |
| 3,472,497 | 10/1969 | Preszler | 73/355 R UX |
| 3,766,379 | 10/1973 | Parkinson | 250/393 X |
| R26,335 | 1/1968 | Chope | 73/398 C |

*Primary Examiner*—Richard C. Queisser
*Assistant Examiner*—Frederick Shoon
*Attorney, Agent, or Firm*—Strauch, Nolan, Neale, Nies & Kurz

[57] ABSTRACT

Apparatus for producing a signal indicative of the temperature of a heated gas comprising a beta particle source; a beta particle detector which intercepts particles emitted from said source; circuitry for converting the detector output to a signal indicative of the density of the gas; a pressure transducer for generating a signal indicative of the pressure on the gas; and circuitry for dividing the pressure signal by the density signal to produce a signal indicative of the average temperature of the gas along the path between the beta particle source and the beta particle detector.

41 Claims, 8 Drawing Figures

APPARATUS USING RADIOACTIVE PARTICLES FOR MEASURING GAS TEMPERATURES

This application is a continuation-in-part of application Ser. No. 293,347 filed Sept. 29, 1972, which is a continuation of application Ser. No. 88,670 filed Nov. 12, 1970. Application Ser. Nos. 293,347 and 88,670 have been abandoned.

The present invention relates to temperature measurement and, more particularly, to novel, improved apparatus for producing a signal indicative of the temperature of a heated gas.

The novel apparatus described herein is particularly useful for measuring turbine inlet gas temperatures, and its principles will be developed primarily in relation to this application. It is to be understood, however, that the invention is not restricted to this particular application but is of general applicability to the measurement of gas temperatures within the limits hereinafter described. Accordingly, all applications of the present invention not expressly excluded from the appended claims are fully intended to be covered therein.

There is at the present time a continuing demand for improvements in the performance of gas turbine propulsion systems, especially for higher specific power and lower specific fuel consumption. This has led to the design of increasingly complex engines and to the use of higher turbine inlet gas temperatures and operation with the turbine blades as near as possible to the material destruction point to achieve maximum performance.

It is accordingly critical that the temperature to which the blades are heated be accurately controlled to prevent over-temperature damage and, also, to provide accurate power control. As a corollary, the control system must have a fast response time to protect engine components from over-temperature damage in the event of an engine surge or similar transient condition. To produce this degree of control, it is necessary to employ a system capable of accurately measuring the temperature of the gas exiting from the combustor of the engine into the turbine nozzle; i.e., the turbine inlet gas temperature.

Direct sensing of turbine inlet gas temperatures is also necessary for closed loop turbine engine control systems, which are now in the planning stage. Such control systems have a number of advantages over the presently employed open loop systems. They are not dependent on altitude, fuel characteristics, combustion and turbine efficiencies, and a host of other factors, all of which contribute to make open loop systems inaccurate and slow to respond. The lack of accuracy and slow response times make it mandatory that wide safety margins be used, resulting in a large sacrifice in efficiency.

A number of systems for measuring turbine inlet gas temperatures have heretofore been considered. In general, such systems can be divided into immersion and non-immersion types. The former include a temperature responsive sensor or target in the hot gases and components which cooperate with the sensor or target to produce a signal indicative of the temperature of the gases in which the sensor or target is immersed. Among the immersion sensors are those of the radiation pyrometer, thermocouple, resistance thermometer, ultrasonic immersion, fluidic oscillator, and differential expansion types.

At the gas velocities and temperatures involved (up to 3000°F with surges to 3500°F), immersion type systems such as those listed above are not feasible because of the rapidity with which the components in the turbine inlet gases deteriorate. Also, the immersed component typically produces unacceptable distortions in the flow pattern of the gas in which it is immersed. In addition, the foregoing and other immersion type systems such as cooled pneumatic and thermodynamic probes are typically unsuitable because they do not have a sufficiently rapid response time. Further, various ones of such sensors are unsuitable because they are too easily contaminated, not capable of measuring other than local or "point" temperatures, not sufficiently accurate, not capable of measuring temperatures over a sufficiently wide range, too complex, too difficult to maintain, and/or not sufficiently reliable.

Non-immersion type sensors include infrared monochromatic radiation (IMRA) pyrometers, laser sensors, and ultrasonic air gap systems. IMRA pyrometers are not suitable for the purposes discussed above because they are not sufficiently accurate over an acceptably wide temperature range and because they are too complex, large and heavy. In addition, they are sensitive to flame streaking, incandescent soot particles, gas stream pressure variations, and flow passage wall radiation. Laser systems are unsuitable because they measure only local temperatures, are highly pressure sensitive, are sensitive to slight dimensional changes caused by vibration, thermal growth, and pressure distortions, and are not adaptable to automatic monitoring. Ultrasonic air gap systems are not satisfactory because they are sensitive to changes in gas composition, noise, gas stream turbulence, and velocity drift and do not have an acceptacle accuracy level.

We have now invented a novel system for measuring turbine inlet gas temperatures which does not have the drawbacks of and is accordingly superior to the systems heretofore proposed for this purpose. The major components of this novel system are a beta particle source or emitter, a beta particle detector, a pressure responsive transducer, and analog circuitry for modifying and combining signals generated by the beta particle detector and the pressure transducer.

The emitter is so located as to emit a beam of beta particles along a path through the turbine inlet gases. The detector is aligned with the emitter at the other end of this path and accordingly intercepts those particles which are not absorbed by the gases along the path between the emitter and detector. The detector generates a signal which is converted by the analog circuitry to a signal indicative of the density of the gases between the particle emitter and the particle detector. The pressure transducer measures and produces a signal indicative of the static pressure on the turbine inlet gases. The analog circuitry divides this signal by the density signal, generating a signal indicative of the average temperature of the gases between the beta particle emitter and the detector.

The components of this novel temperature measuring system are located out of the flow path of the turbine inlet gases. Therefore, they are not subject to oxidative deterioration, even at very high turbine inlet gas temperatures. Also, for this reason, they do not cause distortions in the gas flow pattern. Furthermore, this novel system is accurate over a wide temperature range, has a fast response rate (on the order of ten milliseconds), has a high degree of flexibility in that it can be readily adapted to any type or size of turbine engine, and is insensitive to turbine inlet gas velocities and turbulence and only slightly sensitive to changes in the composition of the turbine inlet gases. The electronic components are relatively few in number and are solid state devices. As a result, the system is light and occupies very little space, is sufficiently rugged to readily withstand the dynamic environment at the turbine inlet (vibration and acceleration), has a useful service life measured in thousands of hours, and requires almost negligible power to operate. Also, our novel system is relatively inexpensive; and its components can be made readily accessible, making it easy to maintain.

In the preferred forms of the invention, air or other gas is circulated through the interface between the emitter and the combustor and through the interface between the detector and the combustor. This keeps soot from being deposited between the emitter and detector. Accordingly, our novel system is not adversely effected by the presence of carbon particles in the turbine inlet gases.

Beta particle sources and detectors have heretofore been employed for a variety of purposes including chemical analysis, surface temperature measurement, phase change determination, gas density measurement (see U.S. Pat. No. 2,908,819 issued Oct. 13, 1959, to J. W. Marx), leak detection, thickness measurement, etc. However, it has not heretofore been realized that such devices can be used to measure gas temperatures by incorporating them in apparatus of the type described briefly above and in detail hereinafter.

U.S. Pat. No. 3,100,395 issued Aug. 13, 1963, to T. J. Morley discloses an arrangement employing a beta emitter and detector for measuring the quality of steam. At first blush, the Morley apparatus appears to resemble that of the present invention. However, a closer inspection of the patent makes it apparent that the Morley apparatus is not capable of providing temperature measurements as will be discussed in more detail hereinafter; and there is nothing in the Morley Patent which even remotely suggests how his apparatus could be modified to make it capable of producing temperature readings.

Other forms of nuclear radiation such as alpha particles and gamma X-rays are not satisfactory for use in the novel temperature measuring apparatus described herein. The rate of attenuation is very sensitive to changes in gas composition, they present significant biological radiation hazards, etc.

From the foregoing it will be apparent that the primary object of the invention resides in the provision of novel, improved apparatus for generating signals which are indicative of the temperature of a heated gas.

A related and primary but more specific object of the invention is to provide novel, impoved apparatus for measuring turbine inlet gas temperatures and the like.

Other important but still more specific objects of the invention reside in the provision of novel, improved apparatus for measuring the temperatures of heated gases which:

1. are accurate over a wide temperature range.
2. have a fast response time.
3. are relatively or completely insensitive to factors such as the velocity and temperature of and turbulence in the gases subjected to temperature measurement as well as to the presence of carbon particles in the gases.
4. are not subject to oxidative deterioration by the gases subjected to temperature measurement.
5. are sufficiently rugged to readily withstand vibration, acceleration, and other dynamic forces.
6. are light and occupy very little space.
7. have a long service life.
8. have very low power requirements.
9. have a limited number of readily accessible components and are accordingly easily serviced.
10. are comparatively inexpensive.
11. have various combinations of the foregoing attributes.

Other important objects and features and additional advantages of the present invention will become apparent from the appended claims and as the ensuing detailed description and discussion proceeds in conjunction with the accompanying drawing, in which:

Figure 1:
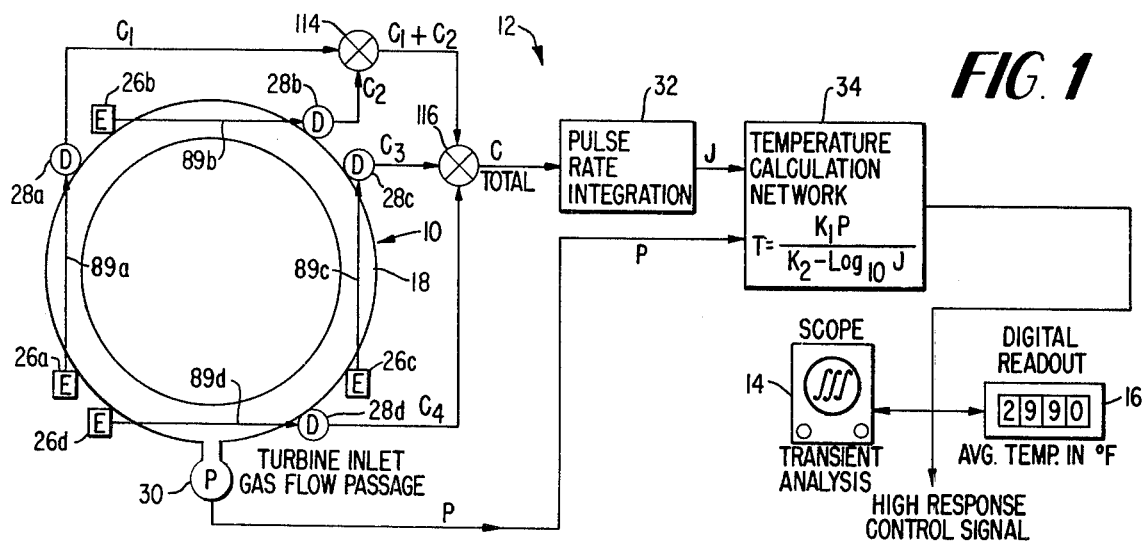
FIG. 1 is a functional block diagram of a turbine engine equipped with temperature measuring apparatus in accord with the principles of the present invention.

Referring now to the drawing, FIGS. 1-5 illustrate a gas turbine engine 10 equipped with apparatus 12 in accord with the principles of the present invention for measuring and providing a signal indicative of the turbine inlet gas temperature. This signal may be employed to control the operation of the engine. Alternatively, or in addition, it may be applied to a scope 14 to provide a visual indication of transients in the temperature of the turbine inlet gases or to a register 16 to provide a digital readout of the gas temperatures.

Turbine engine 10, which is shown in only fragmentary form in the drawing, will typically include a compressor section (not shown) from which compressed air flows into a combustion section or combustor 18 where fuel is mixed with the compressed air and the fuel-air mixture ignited and burned. From the combustion section, the hot compressed air-combustion products mixture flows through nozzle 20 into a turbine 22 which includes a wheel consisting of a plurality of turbine blades or buckets 24 fastened to a rotatably mounted shaft (not shown). As the hot fluid impinges on the turbine buckets, it rotates the shaft of the turbine wheel, which is connected to the turbine engine compressor, and may also be connected to load equipment such as a generator, propeller, or the like, and, in most cases, to auxiliary equipment. Alternatively, the turbine may be employed only to drive the compressor and auxiliary equipment and the hot exhaust gases directed through an appropriately configured nozzle section to increase their velocity energy and thereby produce forces capable of propelling an aircraft or other vehicle.

Gas turbine engines of the type last mentioned (commonly known as turbojet engines) are widely used to propel aircraft. In such applications, particularly in supersonic aircraft, it is important that the engines be operated as efficiently as possible, both in commercial aircraft for reasons of economy and in military aircraft to produce maximum performance. As discussed above, it is important in obtaining maximum operating efficiencies to maintain the turbine inlet gas temperatures as high as possible. On the other hand, the maximum established service temperature of the turbine buckets can not be exceeded as this will result in rapid deterioration of the buckets. It is the function of temperature measuring apparatus 12 to provide an accurate measure of the turbine inlet gas temperature so that the turbine buckets and other heated components of the engine may be maintained at a temperature which is close to but does not exceed the maximum allowable service temperature.

In aircraft (and other) applications, it is also necessary that the temperature measuring system have a fast response to changes in the temperature of the turbine inlet gases. An uncontrolled engine surge can raise turbine blades from a 1700°F operating temperature to a temperature of 1850°F. in 0.1 second, to a temperature of 1970°F. in 0.2 second, and to the melting point (2300°F.) in 0.5 second. Temperature measuring systems as described herein typically have a response time of 10 milliseconds and are accordingly capable of controlling engine surges before appreciable turbine blade temperature rises occur.

Figure 3:
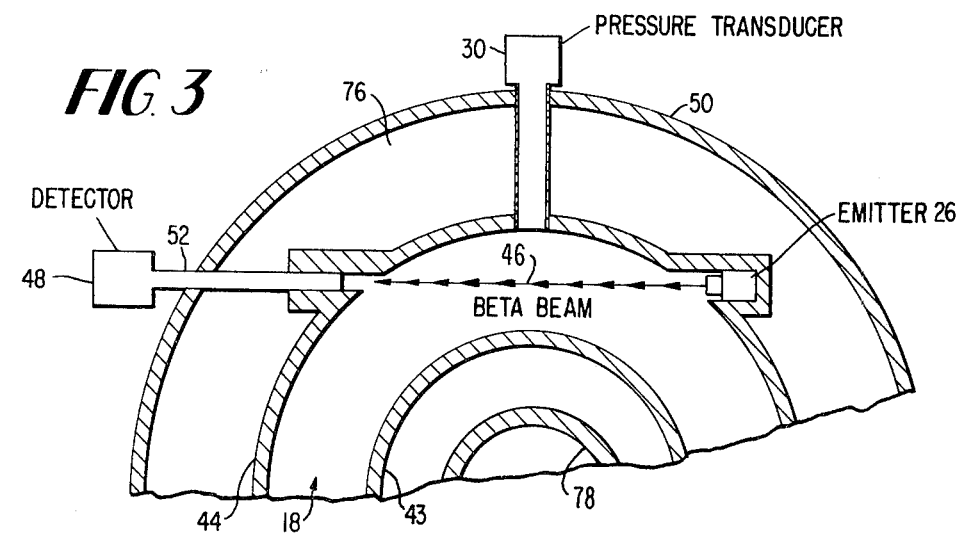
FIG. 3 is a transverse section through the combustor of the turbine engine of FIG. 2, the turbine and temperature measuring apparatus again being shown in generally diagrammatic form and the illustrated components of the latter being in a different orientation than in FIG. 2.
Figure 4:
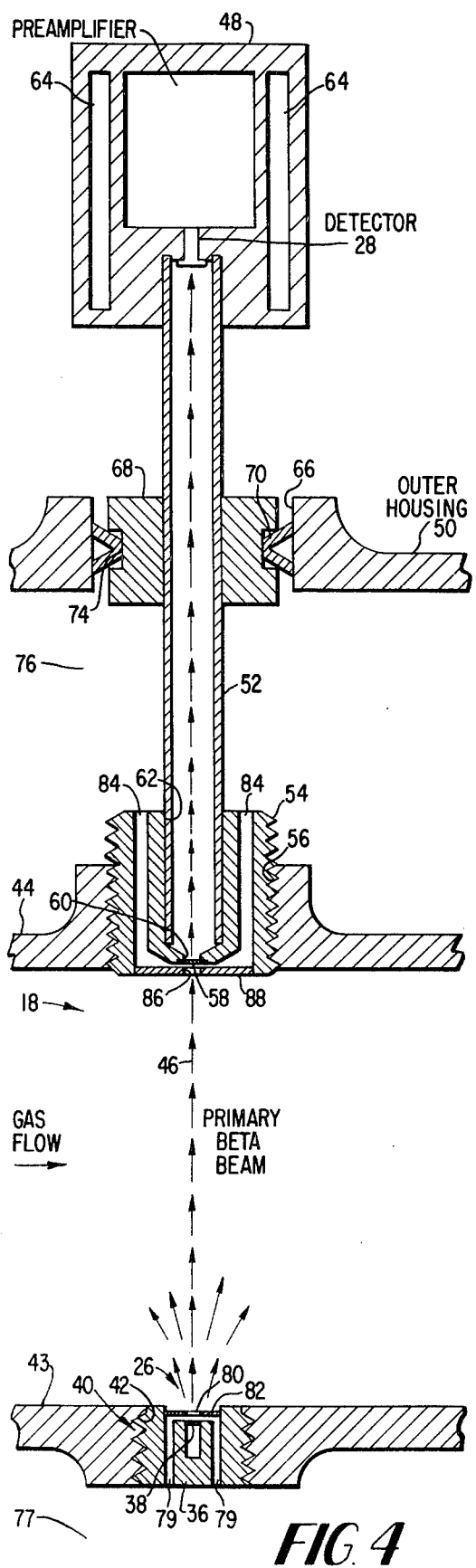
FIG. 4 is a fragment of FIG. 2 to an enlarged scale.
Figure 5:
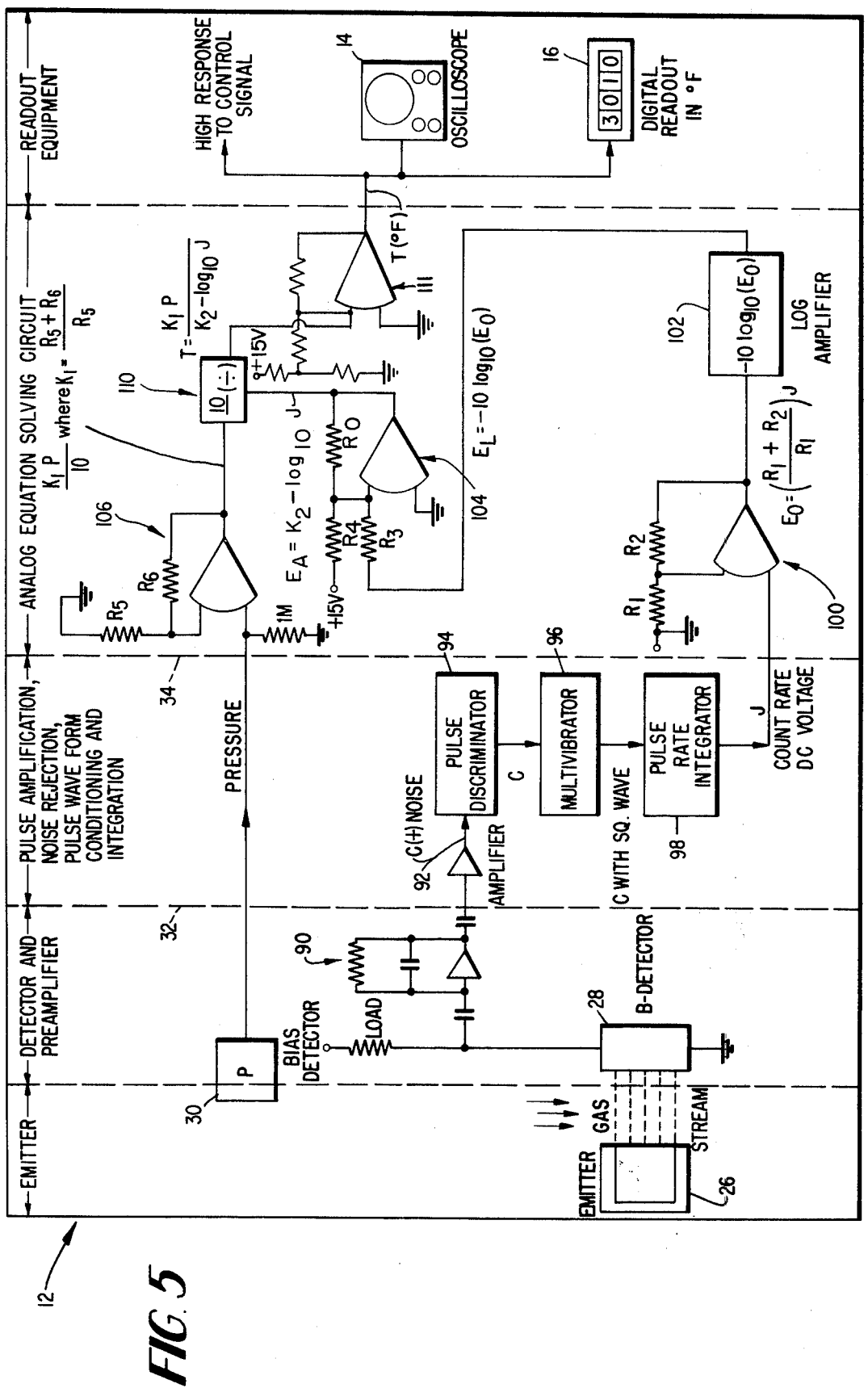
FIG. 5 is a circuit diagram of temperature measuring apparatus constructed in accord with the principles of the present invention.

Referring still to FIGS. 1–5, the major components of temperature measuring apparatus 12 include a beta particle emitter or source 26; a beta particle detector 28; a pressure transducer 30; and pulse amplification, noise rejection, wave form conditioning, and integrating circuitry identified generally by reference character 32 in FIG. 5. Another major component of apparatus 12 is an analog equation solving circuit 34 which modifies the signal generated by circuitry 32 and divides the modified signal into the signal produced by transducer 30 to generate yet another signal indicative of the average temperature of the gases between emitter 26 and detector 28. As mentioned above, the output signal from analog circuit 34 can be employed to control the operation of engine 10 and may alternatively or in addition be applied to scope 14 or digital readout register 16.

Figure 2:
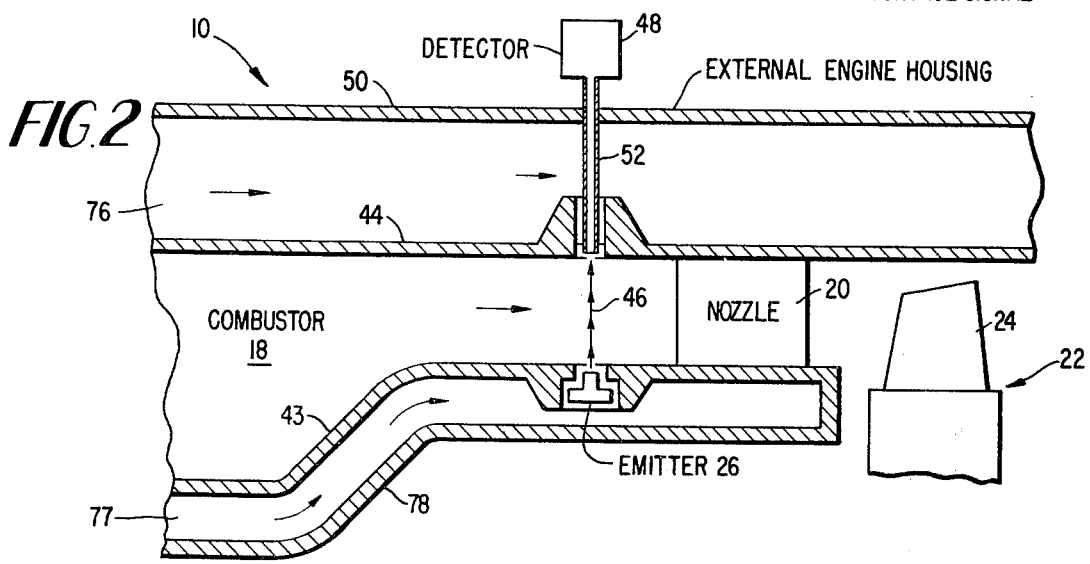
FIG. 2 is a fragmentary longitudinal section through the combustor and turbine of a turbine engine equipped with temperature measuring apparatus in accord with the present invention, this apparatus being shown in generally diagrammatic form.

Referring now specifically to FIGS. 2, 3, and 4, emitter 26 consists of a radioactive isotope sealed in a plug 36 by a foil window 38 through which the beta particles are emitted. Plug 36 will typically have a volume of 0.5 cubic inch or less. The isotope sealed in it will emit a high velocity beam (0.5 MEV, for example) at a rate of several hundred thousand beta particles per second. This rate of emission is independent of the temperature of the isotope; accordingly, it is not necessary to take elaborate precautions to thermally isolate the plug from the interior of combustor 18.

There are a number of isotopes which emit beta particles as they decay. However, many of these are not satisfactory for the purposes of the present invention because they do not have a sufficiently long half-life or a useful endpoint-near, which is expressed as a density times a distance. This endpoint is related to the beta particle energy and, in physical terms, signifies the particle density per unit of distance which will completely absorb the beam of emitted beta particles. As the theoretical endpoint-near is approached, the signal attributable to the beam of beta particles drops off rapidly; and the coefficient of statistical variation increases until the noise equals the signal, which would produce a 100 percent error in the indicated temperature.

Available beta particle emitting isotopes may also be unsuitable for the purposes of the present invention because they emit radiation of a hazardous type such as high energy gamma rays as they decay. Other isotopes are undesirable because they decay into isotopes which are radioactive or because they are chemically active and therefore difficult to encapsulate.

Those isotopes which can be employed in the novel temperature measuring apparatus we have invented are, in order of increasing energy, nickel 63, carbon 14, promethium 147, krypton 85, thallium 204, strontium-yttrium 90, and ruthenium-rhodium 106. Of these krypton 85 is preferred since it has a long half-life (10.4 years) and a large endpoint value. Further, this isotope decays to a non-radioactive compound; and, while it does emit gamma rays as it decays, these have a very low energy value so that, in the amounts employed in temperature measuring apparatus of the type disclosed herein (typically on the order of 300 millicuries), the radiation hazard is practically nonexistent. Furthermore, krypton is a noble gas and therefore not chemically reactive.

There are three types of detectors which have been found satisfactory for use in system 12 as applied to turbine engines. These are scintillation counters, ion chambers, and silicon solid state detectors. All three types of detectors are widely available on a commercial basis, and it is accordingly not believed necessary to describe them in detail herein.

There are of course many other types of beta particle detectors. In different applications of the invention various ones of these may be acceptable alternates or preferable to those named above.

One arrangement of emitter 26 and detector 28 in engine 10 is shown diagrammatically in FIG. 2 and in more detail in FIG. 4. As shown in these Figures, the plug 36 of emitter 26 will typically be an integral part of a fitting 40. This fitting is threaded in an aperture 42 formed in the inner wall 43 of combustor 18, which cooperates with outer wall 44 to give the combustor an annular configuration. The emitter is oriented to emit a stream or beam of beta particles along a path 46 across the combustor slightly upstream of the first-stage turbine nozzle 20.

Detector 28 is mounted in a housing 48 supported from the outer wall 44 of combustor 18 and external engine casing 50 in spaced relation to the latter by evacuated tube 52. Detector 28 is located at one end of tube 52, which is sealed in housing 48. The other end of the tube is sealed in a fitting 54 which is threaded into an aperture 56 through combustor outer wall 44. Evacuated tube 52 locates detector 28 away from housing 50 in an environment where the temperature is relatively low compared to that at the turbine housing. In a typical application, the arrangement illustrated in FIG. 4 will keep the temperature of detector 28 to an acceptably low (less than 200°F.) temperature.

A preamplifier will also typically be housed in casing 48 as shown in FIG. 4. The mounting arrangement just described will also keep the preamplifier at an acceptably low operating temperature.

In extreme applications, a thermal shield and insulation (not shown) can be interposed between the detector housing and the outer casing 50 of the engine, if necessary. Alternatively, air or fuel can be circulated through passages 64 in detector housing 48 to cool the detector.

A foil seal 58 across an aperture 60 aligned with the bore 62 into which tube 52 extends isolates the inner end of the tube from the surrounding environment. Beta particles are attenuated in seal 58 as well as in foil window 38. Such attenuation is compensated for in the analog circuitry 34 to eliminate the error in indicated temperature which would otherwise occur.

Referring again to the drawing, seal 58 also shields detector 28 from infrared photons. Such shielding is necessary because detectors of the silicon solid state type are sensitive to photons and will accordingly produce spurious signals unless shielded from them.

Referring still to FIG. 4, tube 52 is supported in an aperture 66 in turbine casing 50 by support member 68. A sealing ring 70 extending between the periphery of aperture 66 and a peripheral groove 74 in the support member prevents flow from the passage 76 between combustor housing member 44 and casing 50 to the exterior of the turbine.

Turning now to FIGS. 2 and 4, tube 52 is aligned with emitter 26. Accordingly, the beta particles emitted from the latter travel through the combustor along path 46 and then through tube 52 to detector 28. As tube 52 is evacuated, there is no attenuation of electrons in the tube. It is preferable to collimate the electron beam in tube 52 or focus it on detector 28 by electro-optical means located near the entrance of tube 52. This is desirable in the interest of making the detector output signal as large as possible.

Referring still to FIGS. 2 and 4, one of the novel features of the present invention is the use of purging air to keep carbon from being deposited on the window 38 of emitter 26 and on the seal 58 at the inner end of tube 52. More specifically, air is bled from the passage 77 between the inner engine casing 78 and combustor wall member 43 through aperture 79 in the emitter supporting fitting 40, across window 38, and then through a port 80 in a member 82 at the inner end of the fitting and closely adjacent window 38. This keeps carbon from collecting on emitter window 38. Air is similarly bled from the passage 76 between outer combustor wall 44 and outer engine casing 50 through apertures 84 in the fitting 54 which supports the inner end of tube 52 from combustor wall 44 and through a port 86 in a window 88 extending across the inner end of the fitting. This keeps carbon from collecting on the seal at the inner end of tube 52, which is necessary as carbon on window 38 and/or foil seal 58 would absorb beta particles emitted from source 26 and cause the temperature indicated by apparatus 12 to be lower than the actual turbine inlet gas temperature.

The apertures 79 and 86 in windows 82 and 88 will typically be only a few hundredths of an inch in diameter. The volume of purge air required for the purposes just discussed is accordingly extremely low.

As an alternate to the arrangement just described, emitter 26 and/or the inner end of evacuated tube 52 can be recessed in apertures 42 and 56 and gas collimators as described in application Ser. No. 764,234 filed Oct. 1, 1968 (now U.S. Pat. No. 3,584,509) interposed between the detector and/or inner end of the evacuated tube to keep foreign matter from collecting on them.

In conjunction with the foregoing, it is also to be understood that the illustrated orientation of the beta particle emitter and detector is exemplary only. Any arrangement which allows a clear line of sight between the emitter and the detector can be employed. For example, the line of sight can be transversely across the combustor near outer wall 44 as shown in FIGS. 1 and 3 (the beta particle path is identified by reference character 46 or 89), or may even be from a cooled stator to an exterior wall at the inlet end of the turbine section (in this case the emitter is housed in the stator). The electron beam can be directed crosstream of the turbine inlet gases, downstream, or with any other angular relationship between the beam and the gas velocity vectors. Or, a path that will potentially have both hot and cold streaks may be selected so that the average temperature along the path will closely approximate the average temperature of the turbine inlet gases.

Referring now to FIGS. 1 and 5, beta particles impinging on a detector of the ion chamber or scintillator type cause the detector to generate a pulse or burst of low energy electrons. Thus, the output from such a detector is a series of electrical pulses. This detector output is amplified by preamplifier 90 and amplifier 92 and then transmitted to pulse discriminator 94. The pulse discriminator separates components of the signal attributable to noise from the signal components resulting from the impingement of beta particles on detector 28.

The signal is then transmitted to a conventional multivibrator 96, which adds a time constant to the signal. Accordingly, the output signal from the multivibrator is a series of pulses indicative of the detector beta particle count rate. This output is integrated in pulse rate integrator 98, producing a D.C. voltage indicative of the rate at which beta particles are attenuated in detector 28.

This D.C. signal is transmitted to an operational amplifier 100 which is sequentially the first component of analog circuit 34. A constant is added to the count rate signal by the operational amplifier, and the signal is then logarithmically amplified in logarithmic amplifier 102. The output signal from the logarithmic amplifier has the form $E = -\log_{10} J$ where $J$ is the integrated detector count rate.

The rate at which beta particles are absorbed by the gases between beta particle emitter 26 and detector 28 varies with the density of these gases. As the average temperature of the gases along paths 46 or 89 increases, the gas density decreases; and fewer beta particles are absorbed by the gases. Therefore, more particles are attenuated in detector 28, and the magnitude of the output signal from logarithmic amplifier 102 increases. The magnitude of the logarithmic signal accordingly varies inversely with the density of the gases along the emitter-to-detector path.

This inverse signal is subtracted in operational amplifier 104 from a constant magnitude signal $K_2$ which is representative of the logarithm of the rate at which particles emitted from emitter 26 would be absorbed by detector 28 if a perfect vacuum existed between the emitter and detector and also takes into account the fact that not all of the beta particles will have the same energy level. Accordingly, the output from amplifier 104 is a varying voltage signal having a magnitude which is directly proportional to the density of the gases along path 46 (or path 89).

Referring now to FIGS. 1 and 5, the pressure transducer 30 referred to above continuously monitors the static pressure on the turbine inlet gases at generally the same location as emitter 26 and detector 28 and generates a signal proportional in magnitude to the static pressure (alternatively, the transducer may be arranged to measure the compressor pressure, which will be only slightly higher than the pressure on the turbine inlet gases, and an appropriate correction for the differential made in the electronic circuitry).

The transducer may be of any desired type although the capacitive pressure pickup transducer manufactured by Rosemount Engineering Corp. is currently preferred because of it relatively high accuracy, adaptability to severe environments and high temperatures, small size, low weight, etc. Transducer 30 can be threaded into an aperture in the combustor housing in much the same manner as emitter 26 and detector 28 although the mounting arrangement is not critical and has accordingly not been shown in detail in the drawing.

The signal generated by pressure transducer 30 is multiplied by a constant in operational amplifier 106 and then transmitted to a conventional voltage divider 110. Here the pressure signal is divided by the density signal from operational amplifier 104. The output signal from the voltage divider network is therefore a varying voltage signal proportional in degrees Rankine to the average temperature of the gases along the path 46 (or 89) between emitter 26 and detector 28. This signal is converted to one representing degrees Fahrenheit in operational amplifier 111. As discussed above, it can then be utilized to control the operation of engine 10 and/or may be used to provide visual displays of the gas temperature and changes in its magnitude.

To more specifically explain the theory on which temperature measuring system 12 operates, the average temperature T of the gases along the path between emitter 26 and detector 28 is represented by the equation $$T = \frac{P}{R\rho} = \frac{K_1 P}{K_2 - \text{Log } J} \quad (1)$$

where
P is the static pressure on the gases between emitter 26 and detector 28,
R is the gas constant,
$\rho$ is the density of the gases between emitter 26 and detector 28,
$K_1$ is a constant essentially expressing the unit mass of the gas being measured, multiplied by the attenuation constant of the electron beam and divided by the conversion factor from natural to decimal logarithms. Since the temperature is measured in the absolute Rankine units in this application of the invention and P in atmospheres, $K_1$ is measured in degrees R per atmosphere, with a typical value of around 30+ for gas turbine exhaust mixtures close in density to that of air, $K_2$ is a constant which will be developed hereinafter and which takes into account the character of the beta particles emitted from source 26 and the maximum count rate from detector 28, but not the effect of purge air, and J is the detector count rate, given by the relation $$J = J_o e^{-\alpha \Sigma_i \rho_i S_i}$$

(1a)

where $\alpha$, $\rho$, and S are assigned values described hereinafter, and $J_o$ is the signal generated by the beta detector in the absence of any material between the emitter and detector, and for a vacuum between them. It is thus the theoretically highest possible signal.

In practice, there will be windows across the detector and emitter foils isolating these components from the gases being subjected to temperature measurement, and air spaces between these windows and foils. We therefore define a signal $J_{10}$ as the practically possible maximum signal generated by the beta detector, for the condition of vacuum in the space between the foils delimiting the gas to be monitored. It can therefore be defined as $$J_{10} = J_a e^{\alpha \rho_o S}$$

(1b)

where $\rho_i$ is the density, and $S_i$ the thickness of the windows, foil and/or air spaces between the emitter and detector present under all conditions of measurement. It is a feature of this invention that the actual values of $J_o$ and $\rho_i S_i$ are immaterial for the measurement of the parameters of the gas to be monitored.

In the pulse mode of operating just discussed, the output from pulse discriminator 94 is the number of beta particles attenuated in the detector. Multivibrator 96 converts this output to one having the value J; i.e., to a count rate (the number of particles attenuated in the detector per unit of time).

This pulse type count rate output is integrated and a constant added in circuit components 98 and 100 to convert it to a varying voltage $$E_o = \frac{R_1 + R_2}{R_1} \cdot J \quad (2)$$

The logarithmic amplifier 102 converts the signal $E_o$ to a signal $$E_L = -\log \frac{R_1 + R_2}{R_1} \cdot J = -\log E_o \quad (3)$$

In operational amplifier 104, the output $E_L$ is subtracted from the constant magnitude signal $K_2$ to convert it to the density signal $$K_2 - \log J$$

(4)

Simultaneously, the static pressure signal is fed to operational amplifier 106 which adds the system constant $K_1$ to convert the pressure signal to $K_1P/10$.

The pressure and density signals are transmitted to network 110, which divides the pressure signal by the density signal; i.e., solves the equation $$\frac{K_1 P}{10(K_2 - \log J)} \quad (5)$$

and multiples the result by 10 to produce a temperature signal in degrees Rankine. This signal is transmitted to operational amplifier 111 where it is converted to a signal indicative of degrees Fahrenheit by performing the operation $T(°F) = T(°R) - 460$. This signal is utilized in the manner discussed above.

By appropriate adjustment of constant $K_1$, the temperature signal can also be obtained in degrees Kelvin and Centigrades and in other temperature scales.

Or, in general terms, $$T(°G) = \frac{K_1^* P}{10(K_2 - \log J)} - K_3^* \quad (5a)$$

where $T(°G)$ is degrees in the selected temperature scale,
$K_1^*$ is the appropriate constant in the dimensions temperature/pressure, and
$K_3^*$ is a conversion constant for shifting the base of the temperature scale.

In conjunction with the foregoing, temperature measuring apparatus 12 operates on the basic principle that:

$$\frac{\rho T}{P} = \frac{\rho_o T_o}{P_o} \quad (6)$$

where $\rho$ is the density of the gases subjected to temperature measurement along the path between emitter 26 and detector 28,
T is the temperature of the gases along the path,
P is the static pressure on the gases, and
$P_o$ and $T_o$ are standard pressure and temperature or any specifically defined values of temperature and pressure,
$\rho_o$ is the density of the gas at standard temperature and pressure or the specified values of $P_o$ and $T_o$.

Rearranging Equation (6):

$$T = \frac{T_o}{P_o} \cdot \frac{\rho_o}{\rho} \cdot P \quad (7)$$

The density $\rho$ of the gases subjected to temperature measurement bears the following relationship to the count rate derived from the detector output:

$$P = \frac{\ln J_{10} - \ln J}{\alpha S} \quad (8)$$

where:

$\alpha$ is an attenuation constant for source 28,
S is the distance traveled by the beta particles through the gases being subjected to temperature measurement, and
$J_{10}$ is the maximum practical count rate obtainable from the detector; that is, the signal along path S obtained in vacuo as defined above.

Substituting Equation (8) into Equation (2):

$$T = \frac{\frac{T_o}{P_o} \cdot \alpha S \rho_o \cdot P}{\ln J_{10} - \ln J} \text{ in degrees Rankine.} \quad (9)$$

Typically, logarithmic amplifiers are designed to handle decimal, not logarithmic logarithms: Consequently, so that it can be readily handled, both the numerator and the denominator of the temperature expression are divided by $\ln 10$, and the equation becomes:

$$T = \frac{\frac{T_o}{P_o} \cdot \frac{\alpha S \rho_o \cdot P}{\ln 10}}{\log J_{10} - \log J} \quad (10)$$

For beta emitters including Kr 85, the reaction which liberates the beta particle involves the emission of a neutrino. That is:

$$N \, ( \, P \, )^+ + (B)^- + V$$

where $n$ is a neutron, $p^+$ is a proton, and $\nu$ is a neutrino.

As a result of the neutrino emission, the $\beta^-$ particles range through a full energy spectrum. The attenuation constant $\alpha$ is therefore a function of energy: $\alpha = \alpha(E)$. Thus, the radiation is polychromatic; and, for accurate results an effective attenuation constant is employed. The effective $\alpha$ is also a function of $\rho$ and S because the higher energy particles penetrate a larger $\rho S$ distance than those with lower energies.

To compensate for the polychromatic character of the emitted energy, we preferably introduce into the denominators of Equation (9) a compensating factor C in the form of $\ln C$. Thus, corrected for the polychromatic character of the emitted radiation, Equation (9) becomes:

$$T = \frac{\frac{T_o}{P_o} \cdot \alpha \rho_o S \cdot P}{\ln J_{10} + \ln C - \ln J} \quad (11)$$

Equation (10), similarly modified, becomes:

$$\quad (12)$$

The terms $\log J_{10}$ and $\log C$ are both constants and can be combined into a single constant $K_2$. Similarly, constants $T_o$, $P_o$, and $\alpha \rho_o S$ can be combined and divided by $\ln 10$ to give a new constant $K_1$.

Substituting constants $K_1$ and $K_2$ into Equation (12) gives:

$$T = \frac{K_1 P}{K_2 - \log J} \quad (1)$$

This will be recognized as the equation which analog equation solving circuitry 34 is designed to solve.

In applying the principles of the present invention, $P_o$ is generally atmospheric pressure and $T_o$ is 530°R (70°F). The ratio $T_o/P_o$, hence, has the value 36 for purposes of calculations using our invention.

In one installation of the type in which the principles of our invention are embodied, the constant $\alpha \rho_o S$ was empirically determined to be 0.1733, and constant C was similarly found to be 1.1 (in absence of purge air).

Thus, for this installation, $K_1$ is 2.71.

It can be readily demonstrated that:

$$J_{10} = J_a e^{\alpha \rho_o S} \quad (13)$$

where $J_a$ is the detector generated count rate at temperature $T_o$, pressure $P_o$, and gas density $\rho_o$.

In the installation described above, $J_a$ was measured at 800 counts per second. From this value and the values of log C and $\alpha \rho_o S$ given above, the value of constant $K_2$ can be readily calculated to be 4.025.

Substituting the numerical values of $K_1$ and $K_2$ into Equation (1) gives:

$$T = \frac{2.71 P}{4.025 - \log J} \quad (14)$$

Figure 8:
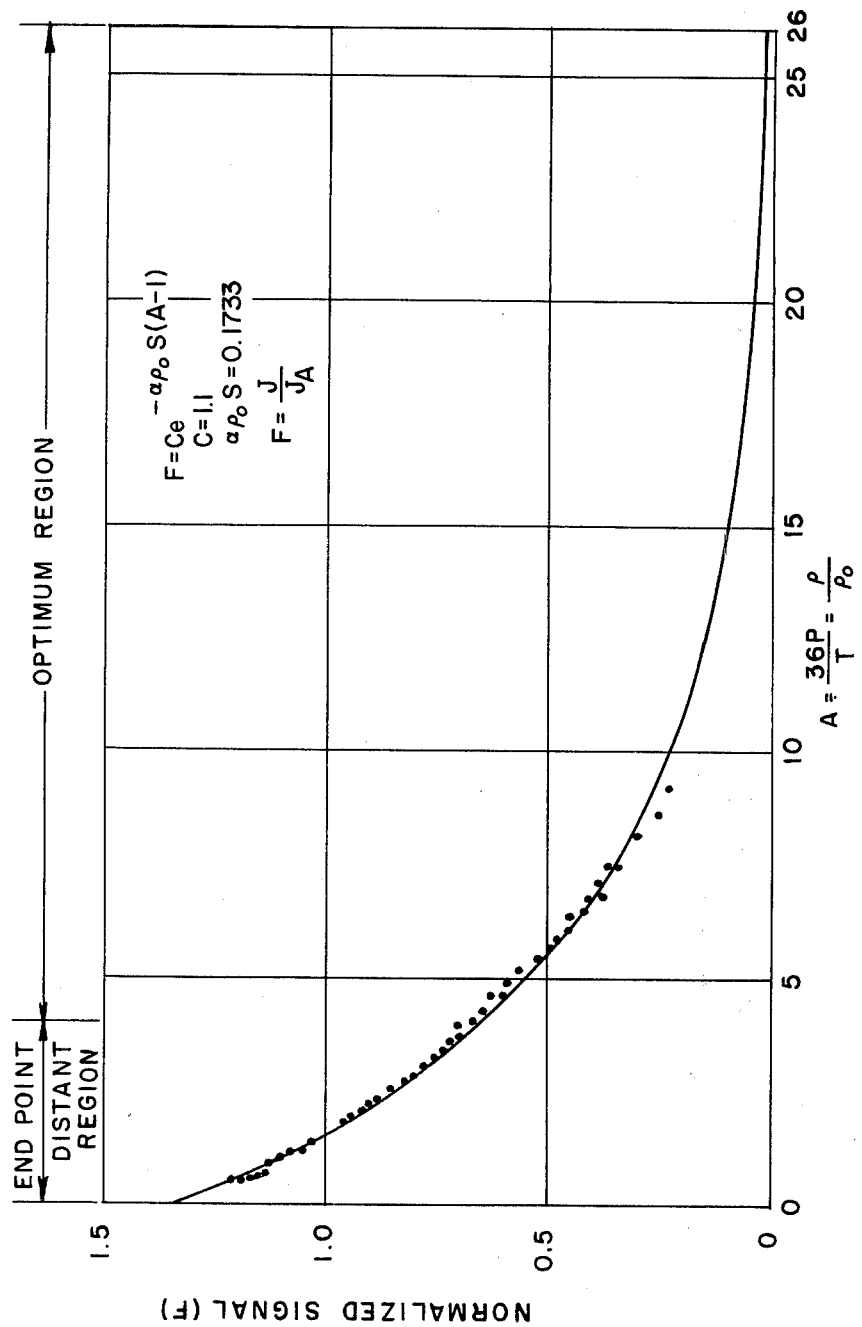
FIG. 8 is a graph showing the close correspondence between calculated and measured values in an apparatus embodying the principles of the present invention.

That Equation (14) accurately described the performance of the apparatus in question is apparent from FIG. 8. In the graph which constitutes this Figure, the abscissa is a variable:

$$A = 36 \frac{P}{T} = \frac{\rho}{\rho_o} \quad \text{(from Equation 7)}$$

The ordinate F is a detector generated count rate signal normalized to standard temperature and pressure as shown by the following equation:

$$F = \frac{J}{J_a} \alpha \rho \quad (15)$$

The empirical relation between the factors F and A in FIG. 8 is closely approximated by the expression $$F = C e^{-\alpha \rho S (A-1)} \quad (15a)$$

shown as the curve while experimentally measured data are entered as points.

It is pointed out, in conjunction with the foregoing, that the values of effective $\alpha \rho_o S$ and C employed in Equation (14) are only first approximations. An even more accurate equation and therefore greater accuracy in actual applications of the temperature measuring apparatus described above can be obtained by more accurately computing these constants.

Equations (1) and (14) do not take into account the signal strength decreasing effect of purge air flowing across the path of the beta particles outside the region in which the temperature of the gases is measured.

Compensation for the effects of purge air is made by use of the following purge-air bias factor:

$$1.0 \geq C' \geq 0.9$$

The correction for the effect of purge air takes the form ln C'. This term is negative for values up to 1.0 and vanishes at 1.0. As the effect of the purge air is to reduce the signal strength, Equation (1) corrected for the effect of purge air and with the correction factor changed to the same $\log^{10}$ basis as the other terms becomes:

$$T = \frac{K_1 P}{K_2 + \log C' - \log J} \quad (16)$$

The term ln C' or log C' is a constant for a given application of our invention and can accordingly be combined with the constants log $J_{10}$ and log C into a single constant like $K_2$. Thus, the equation solving circuitry 34 need not be modified to take the effect of purge air into account (or to compensate for the polychromatic character of the emitted radiation). Only calibration of the circuit for the particular value of the constant in the denominator of the equation is required.

In conjunction with the foregoing, it is of course possible to compensate for the effect of purge air without taking the polychromatic character of the radiation into account by assuming emitted beta particles all have the same energy level and that the emitted energy is therefore monochromatic. In this case the equation to be solved by circuitry 34 would be:

$$T = \frac{K_1 P}{\log J_{10} + \log C' - \log J} \quad (17)$$

Or, both compensations may be disregarded in which case the equation solved by the circuitry is $$T = \frac{K_1 P}{\log J_{10} - \log J} \quad (18)$$

In both of the foregoing cases only calibration of the circuitry is required to effect the solution of the appropriate equation.

While the equation solving circuitry will normally employ amplifiers which produce decimal logarithms, there is no reason that amplifiers capable of generating natural logarithms cannot be used instead. In such circumstances, the counterpart equations to those developed above which the circuitry might be calibrated to solve would include Equation (9) and:

$$T = \frac{\frac{P_o}{T_o} \alpha \rho_o S P}{\ln J_{10} - \ln J} \quad (19)$$

$$T = \frac{\frac{P_o}{T_o} \alpha \rho_o S P}{\ln J_{10} + \ln C - \ln J} \quad (20)$$

$$T = \frac{\frac{P_o}{T_o} \alpha \rho_o SP}{\ln J_{10} + \ln C + \ln C' - \ln J} \quad (21)$$

$$T = \frac{\frac{P_o}{T_o} \alpha \rho_o SP}{\ln J_a + \alpha \rho_o S - \ln J} \quad (22)$$

In applying the principles of the present invention, it is important to keep in mind that the beta emitter employed in temperature measuring apparatus 12 has an endpoint at which the beta particles will be completely attenuated in the gases between the emitter and the detector. The endpoint is expressed as a density times a distance as shown by the equation $$\epsilon = \rho_\epsilon S_\epsilon \quad (23)$$

where
 $\epsilon$ is the endpoint,
 $\rho_\epsilon$ is density of the gases between the beta particle emitter and the beta particle detector, and
 $S_\epsilon$ is the length of the path between the beta particle emitter and the beta particle detector. Since $$\rho_\epsilon \propto \frac{P_\epsilon}{T_\epsilon} \quad (24)$$

$$\epsilon = K_o \frac{P_\epsilon S_\epsilon}{T_\epsilon} \quad (25)$$

where $K_o$ is a proportionality constant. Thus, for a constant temperature T:

$$\epsilon_o = K_o P_\epsilon S_\epsilon$$

Figure 7:
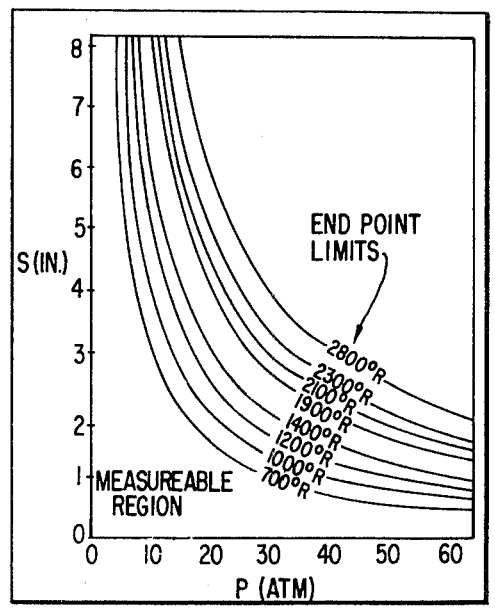
FIG. 7 is a graph designed to illustrate certain limitations on the relative location of the beta particle emitter and detector employed in temperature measuring apparatus constructed in accord with the principles of the present invention.

It is apparent from the foregoing that an isothermic curve can be constructed for any desired temperature $T_\epsilon$. A family of such curves is shown in FIG. 7.

The measurable region of the beta particle emitter for an application of the invention involving a particular maximum temperature is represented by the area under the isothermic curve for that temperature. From the shape of of the isothermal curves it can be seen that this requires a reduction in the emitter-detector path length as the gas pressure increases.

Very short path lengths can be employed irrespective of the temperatures and pressures involved. However, changes in the detector signal are very small in comparison to the signal itself when the path length is very short. Therefore, the apparatus will be relatively insensitive to changes in gas density. Consequently, very short path lengths are not desirable (this is the endpoint-distant region).

As the emitter-detector path length is increased, the magnitude of the signal decreases, and changes in the signal become larger in comparison to the signal (this is the optimum region). Therefore, the temperature measuring apparatus becomes increasingly sensitive, reaching maximum sensitivity at the end-point-near region. However, as this endpoint is closely approached and the signal accordingly approaches zero, the signal will disappear in noise attributable to statistical variations in the beta particle emission, the operation of the electrical components, etc. Accordingly, maximum path lengths are also undesirable; and a somewhat shorter path length is accordingly employed to remain in the optimum region.

Accurate temperature readings depend on a number of factors including the beta particle source which is employed. For the preferred Krypton 85 source, optimum results can be obtained by insuring that $$0.40 < \alpha \Delta \rho S_{\Delta \rho} < 3.60 \quad (26)$$

where $$\Delta \rho = \rho_o \left( \frac{T_o}{P_o} \cdot \frac{P}{T} - 1 \right) \quad (27)$$

for $F = Ce^{-\alpha \Delta \rho S \Delta \rho}$ where,
 $\Delta \rho$ is the change in density in the path between emitter 26 and detector 28 traversed by the gases subjected to temperature measurement, and
 $S_{\Delta \rho}$ is the distance over which $\rho$ changes from $\rho_o$.

Equation (26) also requires that, at standard temperature ($T_o$), pressure ($P_o$), and density $\rho_o$, the $\rho S$ value of windows, foils, and spaces with constant density not exceed the practical value of 0.165 g/cm² when using the beta beam for the Krypton 85 emitter.

The endpoint-distant region is $$0 < \alpha \Delta \rho S_{\Delta \rho} < 0.40 \quad (28a)$$

for apparatus as described above, and the endpoint-near region is $$3.60 < \alpha \Delta \rho S_{\Delta \rho} < 9.00 \quad (28b)$$

Operation in the endpoint-distant region and endpoint-near region and especially near the outer limits of those regions will preferably be avoided for the reasons discussed above.

The temperature measuring apparatus of the present invention just described operates in a completely different manner than the steam quality indicator disclosed in the patent to Morley identified above, and the latter could in no wise be employed for our purposes. In Morley's apparatus steam quality Q is represented by a signal obtained solving the equation:

-Continued $$Q = \frac{BP}{(\ln I_o - \ln I)} \quad (29)$$

where B is an undefined dimensionless scale factor apparently obtained by following the calibration procedure explained in lines 2–7, column 7 of the Morley patent.

The term $K_1$ of the present invention's Equation (1) and B of Morley are not equivalents, but have the following relation:

$$K_1 = B \cdot \frac{T_o}{P_o} \cdot \frac{\rho_o S}{00\%} \cdot \ln 10 \quad (30)$$

Term B of Equation (29) in contrast to constant $K_1$ of Equation (1), does not take into account the emitter-detector distance, the molecular weight of the gases subject to temperature measurement, or the gas constant of the gases, all of which are accounted for in constant $K_1$ as is apparent from Equation (1) and the general gas law:

$$\rho = \frac{1}{R} \cdot \frac{MP}{T} \quad (31)$$

where
M is the molecular weight for the gases subjected to temperature measurement, and
R is the gas constant for those gases.

Similarly, Equation (29) does not take into account the cooling effect of purge air.

Nor does Morley's equation provide any compensation for the polychromatic character of the energy possessed by the beta particles emitted from the radiation source.

In short, circuitry which solves Equation (29) is not capable of providing a signal indicative of gas temperature. Nor is it accurate, especially in applications where purge air has an effect.

It is also significant that the "prior art" apparatus disclosed in the Marx Patent is not suitable for measuring the temperature of gases, especially in applications such as those for which that disclosed herein is particularly intended. The Marx apparatus involves the determination of the mean range $r$ of particles in gases.

The statistical nature of nuclear radiation is such that the uncertainty of the signal J for a one sigma error, is:

$$\Delta J = J \quad (32)$$

Thus, as J approaches zero for reaching the ultimate range $r$ (endpoint), the statistical quantity $$S = \frac{J}{\Delta J} = J - \quad (33)$$

approaches one, the signal disappearing into the noise. Even long before this occurs, the signal-to-noise ratio becomes so small that the signal obtained is meaningless. Hence $r$ cannot be experimentally measured to any accurate extent, and the Marx apparatus would be useless for applications requiring precise measurements such as those with which we are concerned.

When detector 28 is of the solid state silicon type, the beta particles are attenuated in the silicon structure, causing a cascade of low energy electrons to be emitted. In this case the detector output is a varying voltage signal having a magnitude proportional to the count rate of the signal; i.e., a signal of the type generated in pulse rate integrator 98 in the circuitry shown in FIG. 5.

Figure 6:
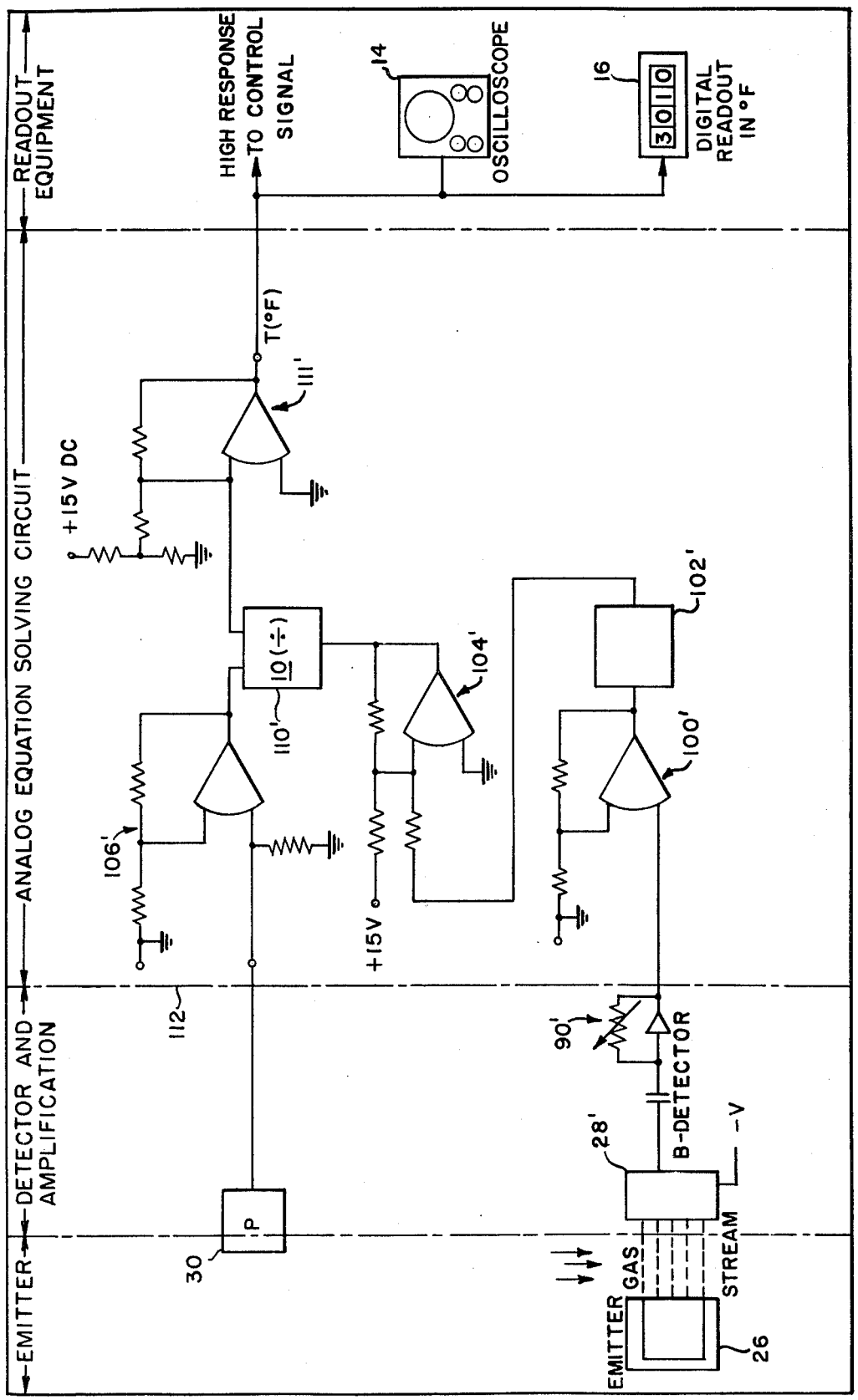
FIG. 6 is a circuit diagram of an alternate form of temperature measuring apparatus.

In view of the nature of the detector output, the somewhat simplified circuitry 112 shown in FIG. 6 can be employed when a solid state silicon type of detector is used and when the detector is of any other type in which the count rate is integrated in the detector itself.

The pulse discriminator discussed above has not been shown in FIG. 6. It may of course be employed although it may not be necessary as noise due to statistical variations of the emission of beta particles from emitter 26 has not been observed when solid state silicon detectors were employed in temperature measuring apparatus of the type described herein.

The circuitry 112 of FIG. 6 solves the equation $$T = \frac{bP}{a - \ln J'} \quad (34)$$

where
T is as defined above,
$b$ is the system constant equivalent to $K_1$ and is also related to the inverse of the gas constant,
$a$ is the equal to $\ln J'_o$, where $J'_o$ is the signal which would be emitted from the detector if a vacuum existed between the emitter and detector,
$J'$ is the detector and output signal.

Since T is also equal to $$\frac{K_1 P}{K_2 - \log J},$$

$$\frac{K_1 P}{K_2 - \log J} = \frac{bP}{a - \ln J'} \quad (35)$$

That is, whether the operation of the temperature measuring apparatus is in the pulse mode or the current mode, the form of the equation solved in the analog circuit is the same. The analog circuitry of FIG. 6 may accordingly be essentially identical to the analog section 34 of the apparatus 12 shown in FIG. 5, and the same reference characters primed have accordingly been employed to identify its components.

To this point, the discussion of our invention has been confined to temperature measurement by use of a single emitter-detector arrangement. As shown in FIG. 1, multiple emitter-detector arrangements may be employed, if desired, to provide an even more accurate indication of average gas temperature. In the arrangement shown in FIG. 1, the magnitude of the temperature signal T is the average of the gas temperature over the four paths 89a–89d between emitter-detector combinations 26a–28a, 26b–28b, 26c–28c, and 26d–28d (a larger or smaller number of emitters and detectors may of course be employed as desired).

More specifically, in the pulse mode of operation, for example, the detectors 28a–28d generate four signals $C_1$, $C_2$, $C_3$, and $C_4$. Signals $C_1$ and $C_2$ are added at summing junction 114; and signals ($C_1+C_2$), $C_3$, and $C_4$ are added at summing junction 116. This produces a pulse type signal C, which is then processed in the manner discussed above.

In the current mode, the operation of a multiple sensing arrangement would be essentially the same except that the input to the analog circuitry would have the value $J=J_1+J_2+J_3+J_4, \ldots J_N$ where each of the component signals $J_1, J_2, \ldots J_N$ is the output from a detector of the solid state silicon type or the equivalent.

It will be apparent from the foregoing that the novel temperature measuring apparatus of the present invention has general applicability to the measurement of gas temperatures. Therefore, as indicated previously, all applications of the present invention not expressly excluded from the appended claims are intended to be covered therein.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for producing a signal indicative of the temperature of a heated gas, comprising: a beta particle emitter; means including a beta particle detector for generating a first signal indicative of the attenuation of the beta particles in a body of gas located between said emitter and said detector; pressure transducer means for generating a second signal indicative of the pressure on the body of gas; and means having as inputs said first and second signals for producing a third signal indicative of the average temperature of said gas along a path between said emitter and said detector.

2. The signal producing apparatus of claim 1, wherein the beta particle emitter is selected from the group consisting of nickel 63; carbon 14; promethium 147; krypton 85; thallium 204; phosphorous 32; strontium, yttrium 90; and ruthenium, rhodium 106.

3. The signal producing apparatus of claim 2, wherein the beta particle emitter is krypton 85.

4. The signal producing apparatus of claim 1, wherein said detector is disposed at a location removed from said body of gas and including means for conducting beta particles from said body of gas to said detector and means for preventing foreign matter from being deposited on said beta particle emitter and on the conducting means.

5. The signal producing apparatus of claim 1, together with means for cooling said detector to thereby keep it from being overheated.

6. Apparatus for producing a signal indicative of the temperature of a heated gas, comprising a beta particle source; a detector disposed in spaced relationship to and aligned with said source, said detector being designed to generate an output signal each time a beta particle impinges thereon, whereby the detector output signals constitute a count of the particles striking the detector; pulse discriminator means for separating signals indicative of noise from those generated by said detector; means for converting the detector output signals to a varying voltage signal indicative of the detector count rate; means for converting the count rate signal to one which is indicative of the density of a body of gas located between said source and said detector; transducer means for generating a signal indicative of the pressure on said body of gas; and means for dividing said pressure signal by said density signal to thereby produce a signal indicative of the average temperature of said body of gas along a path between the beta particle source and the detector.

7. The apparatus of claim 6, wherein the means for converting the particle count signals to the varying voltage count rate signal is incorporated in said detector.

8. The apparatus of claim 6, wherein the means for converting the varying voltage count rate signal to the density signal comprises means for converting said count rate signal to a signal indicative of the logarithm of the count rate; means for generating a reference signal indicative of the logarithm of the count rate of the particles emitted from the beta particle source at a selected temperature and pressure in a given gas or gas mixture and means for subtracting the logarithmic detector count rate signal from the logarithmic reference signal count rate at the selected temperature and pressure and in the same gas or gas mixture.

9. The apparatus of claim 8, wherein the means for generating the reference signal comprises means for generating a signal having the value $J_{10}$ where $J_{10} = J_a e^{+\alpha \rho_o S}$
where
 $J_a$ is the detector generated count rate at a selected temperature $T_o$, a selected pressure $P_o$, and a selected gas density $\rho_o$,
 $\alpha$ is an effective attenuation constant for the beta particle source, and
 S is the distance through of the body of gas to be monitored, which is traversed by the beta particles.

10. The apparatus of claim 6, wherein the means for converting the varying voltage count rate signal to the density signal comprises means for converting said count rate signal to a signal indicative of the logarithm of the count rate; means for generating a signal indicative of the logarithm of the count rate in vacuo of the particles emitted from the beta particle source; and means for subtracting the logarithmic detector count rate signal from the logarithmic in vacuo count rate signal.

11. The apparatus of claim 6, wherein the means for dividing the pressure signal by the density signal is means for performing the operation $$K_1 P \div (K_2 - \log J)$$

where $$K_1 = \frac{T_o}{P_o} \cdot a \rho_o S,$$

$T_o$ is a standard temperature,
 $P_o$ is a standard pressure,
 $a$ is the attenuation constant for the beta particle emitter being used,
 $\rho_o$ is the density of the gas at temperature $T_o$ and pressure $P_o$,
 S is the distance the beta particles traverse in the region where the gas temperature is measured,
 P is the measured static pressure on the gas, J is the detector generated particle count rate, and $K_2 = \log J_{10} + \log C$ where C is a constant which compensates for the polychromatic character of the beta particles emitted from the beta particle emitter and $J_{10}$ is the maximum particle detector generatable count rate.

12. The apparatus of claim 6, wherein the means for dividing the pressure signal by the density signal is means for performing the operation $$K_1 P \div K_2 + \log C' - \log J$$

where:

$$K_1 = \frac{T_o}{P_o} \cdot \alpha \rho_o S,$$

$T_o$ is a standard temperature, $P_o$ is a standard pressure, $\alpha$ is the attenuation constant for the beta particle emitter, $\rho_o$ is the density of the gas temperature $T_o$ and pressure $P_o$, S is the distance the beta particles traverse in the region where the gas temperature is measured, P is the measured static pressure of the gas, J is the detector generated particle count rate, $K_2 = \log J_{10} + \log C$ where C is a constant which compensates for the polychromatic character of the beta particles emitted from the beta particle emitter and $J_{10}$ is the maximum detector generatable count rate, and C' is a constant which compensates for the attenuating effect of gases other than that subjected to temperature measurment on the particles emitted from the beta particle emitter with $0.9 \leq C \leq 1.0$.

13. The apparatus of claim 6, together with means connected to said signal dividing means and activatable by the output signal therefrom to produce a digital readout indicative of the average temperature of the gases between the beta particle source and the beta particle detector.

14. The apparatus of claim 6, together with means connected to said signal dividing means and activatable by the output signal therefrom to provide a visual display of transients in the temperature of the gas between the beta particle source and the beta particle detector.

15. Apparatus for producing a signal indicative of the average temperature of a heated gas, comprising: a beta particle emitter; means including a beta particle detector disposed in spaced relation to and aligned with said emitter for generating a first signal indicative of the attenuation of the particles emitted from said beta particle emitter in a body of gas located between said emitter and said detector; means for generating a second signal indicative of the pressure on said gas; and means having as inputs said first and second signals for producing a signal which is indicative of the average temperature of the gas along a path between the beta particle emitter and the beta particle detector and has a magnitude determined by the algebraic fraction $$\frac{\frac{P_o}{T_o} \cdot \frac{\alpha \rho_o S}{\ln 10} \cdot P}{\log J_{10} - \log J},$$

where $T_o$ is a standard temperature, $P_o$ is a standard pressure, $\alpha$ is the attenuation constant for the beta particle emitter, $\rho_o$ is the density of the gas at temperature $T_o$ and pressure $P_o$, S is the distance between the beta particle emitter and the beta particle detector, P is the measured static pressure on the gas, J is the detector generated particle count rate, and $J_{10}$ is the maximum practically possible signal generated by the beta detector.

16. The apparatus of claim 15, wherein the spatial relation between the beta particle emitter and the beta particle detector with respect to the body of gas therebetween is such that $$0.40 < \alpha \Delta \rho S_{\Delta \rho} < 3.60,$$

where $\Delta \rho$ is the change in density of the gases subjected to temperature measurement along the path traversed by the beta particles between the beta particle emitter and the beta particle detector, and $S_{\Delta \rho}$ is the distance over which $\Delta \rho$ changes from the density of the gases at a standard temperature and pressure.

17. The apparatus of claim 15, wherein the signal producing means is capable of generating a signal having a magnitude determined by an algebraic expression as aforesaid, but also having in the denominator thereof the expression $+ \log C$ where C is a constant which compensates for the polychromatic character of the beta particles emitted from the beta particle emitter.

18. The apparatus of claim 17, wherein $C = 1.1 \pm 25$ percent of 1.1.

19. The apparatus of claim 15, wherein the signal producing means is capable of generating a signal having a magnitude determined by an algebraic expression as aforesaid, but also having in the denominator thereof the expression $+ \log C'$ where C' is a constant which compensates for the attenuating effect of gases other than that subjected to temperature measurement on the particles emitted from the beta particle emitter.

20. The apparatus of claim 19, where $0.9 \leq C' \leq 1.0$.

21. The apparatus of claim 15, wherein the signal producing means is capable of generating a signal having a magnitude determined by an algebraic expression as aforesaid, but also having in the denominator thereof the expression $\log C + \log C'$ where C' is a constant which compensates for the attenuating effect of gases other than that subjected to temperature measurement on the particles emitted from the beta particle emitter, and C is a constant which compensates for the polychromatic character of the beta particles emitted from the beta particle emitter.

22. The apparatus of claim 21, where $0.9 \leq C' \leq 1.0$.

23. Apparatus for producing a signal indicative of the average temperature of a heated gas, comprising: a beta particle emitter; means including a beta particle detector disposed in spaced relation to and aligned with said emitter for generating a first signal indicative of the attenuation of the particles emitted from said beta particle emitter in a body of gas located between said emitter and said detector; means for generating a second signal indicative of the pressure on said gas; and means having as inputs said first and second signals for producing a signal which is indicative of the average temperature of the gas along a path between the beta particle emitter and the beta particle detector and has a magnitude determined by the algebraic fraction $$\frac{\frac{P_o}{T_o} \cdot \alpha \rho_o S \cdot P}{\ln J_{10} - \ln J},$$

where
- $T_o$ is a standard temperature,
- $P_o$ is a standard pressure,
- $\alpha$ is the attenuation constant for the beta particle emitter,
- $\rho_o$ is the density of the gas at temperature $T_o$ and pressure $P_o$,
- S is the distance the beta particles traverse in the region where the gas temperature is measured,
- P is the measured static pressure on the gas,
- J is the detector generated particle count rate,
- $J_{10}$ is the maximum detector generatable count rate with $\ln J_{10} = \ln J_a + \alpha \rho_o S$, and
- $J_a$ is the count rate generated by the detector at $P_o$, $T_o$, $\rho_o$.

24. The apparatus of claim 23, wherein the spatial relation between the beta particle emitter and the beta particle detector with respect to the body of gas therethrough is such that $$0.40 < \alpha \rho S_{\Delta \rho} < 3.60,$$

where
- $\Delta \rho$ is the change in density of the gases subjected to temperature measurement along the path traversed by the beta particles between the beta particles emitter and the beta particle detector, and
- $S_{\Delta \rho}$ is the distance over which $\Delta \rho$ changes from the density of the gases at a standard temperature and pressure.

25. The apparatus of claim 23, wherein the signal producing means is capable of generating a signal having a magnitude determined by an algebraic expression as aforesaid, but also having in the denominator thereof the expression $+\ln C$ where C is a constant which compensates for the polychromatic character of the beta particles emitted from the beta particle emitter.

26. The apparatus of claim 25, wherein $C = 1.1 \pm 25$ percent of 1.1.

27. The apparatus of claim 23, wherein the signal producing means is capable of generating a signal having a magnitude determined by an algebraic expression as aforesaid, but also having in the denominator thereof the expression $+\ln C'$ where $C'$ is a constant which compensates for the attenuating effect of gases other than that subjected to temperature measurement on the particles emitted from the beta particle emitter.

28. The apparatus of claim 27, where $0.9 \leq C' \leq 1.0$.

29. The apparatus of claim 23, wherein the signal producing means is capable of generating a signal having a magnitude determined by an algebraic expression as aforesaid, but also having in the denominator thereof the expression $\ln C + \ln C'$ where
- $C'$ is a constant which compensates for the attenuating effect of gases other than that subjected to temperature measurement on the particles emitted from the beta particle emitter, and
- C is a constant which compensates for the polychromatic character of the beta particles emitted from the beta particle emitter.

30. The apparatus of claim 29, where $0.9 \leq C' \leq 1.0$.

31. The apparatus of claim 30, where $C = 1.1 \pm 25$ percent of 1.1.

32. The apparatus of claim 29, where $C = 1.1 \pm 25$ percent of 1.1.

33. Apparatus for producing a signal indicative of the average temperature of a heated gas, comprising: a beta particle emitter; means including a beta particle detector disposed in spaced relation to and aligned with said emitter for generating a first signal indicative of the attenuation of the particles emitted from said beta particle emitter in a body of gas located between said emitter and said detector; means for generating a second signal indicative of the pressure on said gas; and means having as inputs said first and second signals for producing a signal which is indicative of the average temperature of the gas along a path between the beta particle emitter and the beta particle detector and has a magnitude determined by the algebraic fraction $$\frac{\frac{P_o}{T_o} \cdot \alpha \rho_o S \cdot P}{\ln J_a + \alpha \rho_o S - \ln J},$$

where
- $T_o$ is a standard temperature,
- $P_o$ is a standard pressure,
- $\alpha$ is the attenuatiaon constant for the beta particle emitter,
- $\rho_0$ is the density of the gas at temperature $T_o$ and pressure $P_o$,
- S is the distance the beta particles traverse in the region where the gas temperature is measured,
- P is the measured static pressure on the gas,
- J is the detector generated particle count rate, and
- $J_a$ is the count rate generated by the detector at $P_o$, $T_o$, $\rho_o$.

34. The apparatus of claim 33, wherein the signal producing means is capable of generating a signal having a magnitude determined by an algebraic expression as aforesaid, but also having in the denominator thereof the expression $+\ln C$ where C is a constant which compensates for the polychromatic character of the beta particles emitted from the beta particle emitter.

35. The apparatus of claim 34, wherein $C = 1.1 \pm 25$ percent of 1.1.

36. The apparatus of claim 32, wherein the signal producing means is capable of generating a signal having a magnitude determined by an algebraic expression as aforesaid, but also having in the denominator thereof the expression $+\ln C'$ where $C'$ is a constant which compensates for the attenuating effect of gases other than that subjected to temperature measurement on the particles emitted from the beta particle emitter.

37. The apparatus of claim 36, where $0.9 \leq C' \leq 1.0$.

38. The apparatus of claim 33, wherein the signal producing means is capable of generating a signal having a magnitude determined by an algebraic expression as aforesaid, but also having in the denominator thereof the expression $lnC + lnC'$ where
- $C'$ is a constant which compensates for the attenuating effect of gases other than that subjected to temperature measurement on the particles emitted from the beta particle emitter, and
- $C$ is a constant which compensates for the polychromatic character of the beta particles emitted from the beta particle emitter.

39. The apparatus of claim 38, where $0.9 \leq C' \leq 1.0$.

40. The apparatus of claim 38, where $C = 1.1 \pm 25$ percent of 1.1.

41. The apparatus of claim 33, wherein the spatial relation between the beta particle emitter and the beta particle detector with respect to the body of gas therebetween is such that $$0.40 < \alpha \Delta \rho S_{\Delta \rho} < 3.60,$$

where
- $\Delta \rho$ is the change in density of the gases subjected to temperature measurement along the path traversed by the beta particles between the beta particle emitter and the beta particle detector, and
- $S_{\Delta \rho}$ is the distance over which $\Delta \rho$ changes from the density of the gases at a standard temperature and pressure.

* * * * *

UNITED STATES PATENT OFFICE
CERTIFICATE OF CORRECTION

PATENT NO. : 3,874,238
DATED : April 1, 1975
INVENTOR(S) : William A. Compton et al It is certified that error appears in the above-identified patent and that said Letters Patent are hereby corrected as shown below:

Column 3, line 56, change "impoved" to --improved--.

Column 10, equation (1a), change "$J=J_0 e^{-\alpha_i \Sigma_i \rho_i S_i}$" to --$J=J_0 e^{-\alpha_0 S}$--.

Column 10, equation (1b), change "$J_{10}=J_a e^{\alpha \rho_0 S}$" to --$J_{10}=J_0 e^{-\alpha \Sigma_i \rho_i S_i}$--.

Column 12, line 31 change "N(P)$^+$+(B)$^-$+V" to --$n \rightarrow (p)^+ + (\beta)^- + \nu$--.

Column 13, equation (13), change "$J_{10} = J_a e^{\alpha \rho_0 S}$" to --$J_{10} = J_a e^{\alpha \rho_o S}$--.

Column 13, equation (15), change "$F = \frac{J}{J_a} \alpha \rho$" to --$F = \frac{J}{J_a}$--.

Column 14, line 10, change "$\log^{10}$" to --$\log_{10}$--.

Column 15, after equation (23), change the apostrophe to a comma.

Column 17, equation (30), change "00%" to --100%--.

Column 17, equation (32), change "$\Delta J = J$" to --$\Delta J = J^{\frac{1}{2}}$--.

UNITED STATES PATENT OFFICE
CERTIFICATE OF CORRECTION

PATENT NO. : 3,874,238  
DATED : April 1, 1975  
INVENTOR(S) : William A. Compton et al Page 2, It is certified that error appears in the above-identified patent and that said Letters Patent are hereby corrected as shown below:

(continued)

Column 17, equation (33), change "$S = \frac{J}{\Delta J} = J-$" to $--\partial = \frac{J}{\Delta J} = J^{\frac{1}{2}}--$.

Column 20, line 29, change "$+\alpha \rho_0 \quad S$" to $--+\alpha \rho_0 S--$.

Column 21, claim 12, 2nd equation, change "a" to --$\alpha$--.

Column 23, lines 37-38, change "therethrough" to --therebetween--.

Column 23, claim 24, change "$\alpha \rho S_{\Delta \rho}$" to --$\alpha \rho S_{\Delta \rho}$--.

Column 23, line 44, change "particles" (2nd occurrence) to --particle--.

Column 24, claim 36, line 62, change "32" to --33--.

Column 25, claim 36, line 2, change "partic e" to --particle--.

Signed and Sealed this fourteenth Day of October 1975

[SEAL]

Attest:

RUTH C. MASON  
*Attesting Officer*

C. MARSHALL DANN  
*Commissioner of Patents and Trademarks*